United States Patent [19]

Oberster et al.

[11] 4,064,095

[45] Dec. 20, 1977

[54] POLY(PHOSPHAZENE) COMPOSITIONS

[75] Inventors: Arthur Eugene Oberster, North Canton; David Francis Lawson, Akron, both of Ohio

[73] Assignee: The Firestone Tire & Rubber Company, Akron, Ohio

[21] Appl. No.: 705,497

[22] Filed: July 15, 1976

[51] Int. Cl.$^2$ ............................................. C08L 79/00
[52] U.S. Cl. ................................. 260/37 R; 260/45.7 R
[58] Field of Search ................. 260/2 P, 30.6 R, 37 R

[56] References Cited

U.S. PATENT DOCUMENTS

| | | | |
|---|---|---|---|
| 3,202,567 | 8/1965 | Muri et al. | 260/42.43 X |
| 3,677,999 | 7/1972 | Denk et al. | 260/DIG. 24 |
| 3,883,451 | 5/1975 | Reynard et al. | 260/2 P |
| 3,931,095 | 1/1976 | Kondo et al. | 260/DIG. 24 |
| 3,943,088 | 3/1976 | Kyker et al. | 260/30.6 R |
| 3,945,966 | 3/1976 | Vicic et al. | 260/2 P X |
| 3,948,820 | 4/1976 | Reynard et al. | 260/2 P |
| 3,994,838 | 11/1976 | Thompson et al. | 260/2.5 FP |

*Primary Examiner*—Lewis T. Jacobs

[57] ABSTRACT

Poly(phosphazene) compositions exhibiting excellent flame resistance and low smoke output are produced by the addition of fillers from a class of fillers which decompose endothermically when heated to an appropriate temperature. The compositions may also include plasticizers such as triarylphosphates. The resulting compositions are particularly useful as coatings for wire and cable members.

9 Claims, No Drawings

POLY(PHOSPHAZENE) COMPOSITIONS

This invention relates to compositions based on poly(phosphazenes), which are useful as foams and/or coatings or as other elastomeric articles and which generate very little smoke and exhibit a very low flame spread when exposed to a fire.

More particularly, the invention relates to compositions which include a class of fillers which, when compounded with elastomeric phosphazene polymers, diminish the output of visible smoke when the compounded material is exposed to flames or to high temperatures. The class of fillers which have been found to be particularly useful are readily decomposable compounds of alkaline earth metals or aluminum, which upon heating to their decomposition temperatures release either $H_2O$ or $CO_2$ and adsorb a large amount of heat, typical examples of such compounds include simple hydroxides or hydrated oxides such as $Ca(OH)_2$, $Mg(OH)_2$ and $Al_2O_3 \cdot 3H_2O$; simple carbonates such as $CaCO_3$; and more complex compounds including $(MgCO_3)_4 \cdot Mg(OH)_2 \cdot 5H_2O$, $Na_2O \cdot Al_2O_3 \cdot 2H_2O$ (Dawsonite) and others of a similar chemistry.

A principal object of this invention is to provide formulations based on phosphazene elastomers exhibiting very low smoke output and high flame resistance. Polymeric phosphazenes having good fire resistance are described in a number of recently issued United States Patents. It has been found that when these are compounded with a sufficient amount of fillers of this invention the flammability and smoke output of the resulting composition are further improved. This invention resides in the use of fillers which endothermically decompose to yield $CO_2$ and/or $H_2O$ when sufficiently heated, the presence of which in poly(phosphazene) compositions reduces visible smoke output beyond the improvements obtained with previously known fillers. In addition, the invention resides in the use of fillers which appear to be compatible with types of plasticizers which are useful in enhancing the properties of a compounded poly(phosphazene). This is in marked contrast to some prior art fillers which have been found to be incompatible with phosphate type plasticizers commonly used in the compounding of poly(phosphazenes).

In summary then, the present invention provides compositions comprising poly(phosphazenes) and specific fillers, and in some cases plasticizers which possess excellent flame resistance and low smoke output.

THE POLY(PHOSPHAZENES)

For many applications such as wire and cable coatings, elastomeric coatings which possess an inherently good fire resistance, are desired. Poly(phosphazenes) such as those described in the following U.S. Pat. Nos. exhibit such a fire resistance: 3,853,794 issued Dec. 10, 1974; 3,856,712 issued Dec. 24, 1974; 3,856,713 issued Dec. 24, 1974 and 3,883,451 issued May 13, 1975.

Other poly(phosphazenes) to which the present invention is applicable are described in the literature, in other issued patents and in pending patent applications.

Further properties desired in the compounded poly(phosphazenes) are low smoke generation, and compatibility with fillers and other additives the use of which permit the poly(phosphazenes) to be compounded, and cured or vulcanized in much the same fashion that compositions based on natural rubber or synthetic rubbers are processed.

FILLERS

The fillers found useful for the preparation of the improved smoke suppressant-flame retardant poly(phosphazene) compositions of this invention are certain selected inorganic compounds of aluminum or of alkaline earth metals, particularly magnesium or calcium, these compounds being those which are readily decomposable when heated, and which yield non-flammable combustion products such as $CO_2$ or $H_2O$.

Preferred compounds are carbonates, bicarbonates, and hydroxides of Mg, Ca or Al particularly those which decompose endothermically when heated. Specific examples of suitable fillers include:

$(MgCO_3)_4 \cdot Mg(OH)_2 \cdot 5H_2O$; $Mg(OH)_2$;
$Al_2O_3 \cdot 3H_2O$; $CaCO_3$;
$Ca(OH)_2$; $3MgO \cdot MgCl_2 \cdot 11H_2O$;
$5MgO \cdot MgCl_2 \cdot 13H_2O$; $NH_4AlCO_3(OH)_2$;
Dawsonite($NaAlCO_3(OH)_2$) or ($Na_2O \cdot Al_2O_3 \cdot 2CO_2 \cdot 2H_2O$).

THE PLASTICIZERS

Plasticizers which are compatible with the fillers indicated above include triaryl phosphates, particularly tricresyl phosphate, isodecyl diphenyl phosphate, tri(metaethylphenyl) phosphate, and low molecular weight polyphosphazenes such as 4-ethylphenoxy, phenoxycyclotriphosphazene and poly(4-ethylphenoxy, phenoxyphosphazene) having a dilute solution viscosity of about 0.2.

The invention will be more fully understood from the Examples which follow, in which preferred embodiments of the invention are set forth by way of illustration, and not by way of limitation.

TEST METHODS

The screening method used to indicate the flammability behavior in these examples is the limiting oxygen index (LOI) technique. This measurement is defined as the percentage of oxygen in a nitrogen-oxygen mixture which is sufficient to maintain combustion in a vertically-positioned, top-lighted specimen measuring ⅛ inch × ¼ inch × 5 inches. The LOI figure is determined by the following equation in which the bracketed units refer to the volume of the oxygen and nitrogen in the atmosphere.

$$LOI = \frac{[O_2]}{[O_2] + [N_2]} \times 100$$

and is found by determining at what minimum oxygen concentration the polymer specimen will either (a) burn longer than three minutes or (b) burn farther than three inches. The determination is repeated several times for verification. A more complete and detailed description of the LOI test is given in test specification ASTM D-2863-70.

It is evident from the definition of LOI that higher LOI numbers infer lower flammability of the specimens tested in this configuration. LOI numbers above 21-22 indicate that combustion is not sustained in an ambient atmosphere. It has been reported that for certain molding compounds LOI results can be used to predict performance in other flame tests.

NATIONAL BUREAU OF STANDARDS (NBS) SMOKE DENSITY TEST

An Aminco — NBS smoke density chamber was employed in the smoke evaluations. The instrument consists of a closed 18 cubic foot box which contains heater and pilot flame sources, specimen support, light source and a photomultiplier/microphotometer for the precise measurement of light intensities in the range of 100% to 0.001% trasmittance. The attenuation of incident light is measured over a vertical path length of 3 feet. A 3 inches × 3 inches in the support frame results in a 2 9/16 inches × 2 9/16 inches exposed surface and the specimen thickness can be varied up to one inch maximum.

Two types of exposure are possible. In both types radiant heat of 2.5 W/cm$^2$ (2.2 BTU/sec/ft$^2$) is maintained on the vertically positioned sample by an electric furnace. In the non-flaming exposure this is the only source of heat, while in the flaming exposure additional heat is provided by a propane/air pilot flame. The burner can play a flame directly on the specimen or on the speciman and any molten material developed. As smoke develops, it is measured as a drop in percent transmittance (% T) of light.

SMOKE DENSITY MEASUREMENTS

It should be noted that the NBS smoke chamber test is not intended to simulate an actual fire situation and that test results cannot be used to predict performance in a fire. Large scale tests where end-use quantities and configurations are considered would be necessary for this. However, the test is useful for screening relative smoke tendencies on a laboratory scale. Some terminology of the NBS smoke test used here and in the tables which follow are summarized below:

$D_{mc}$ = Specific optical density at maximum smoke intensity, corrected for fogging of lense seals. $D_{mc}$ < 25, light; 25–75 moderate; 100–400, dense; > 400 very dense.

t.9 $D_m$ = Time (minutes) to reach 90% of maximum optical density.

$tD_{16}$ = Time (minutes) to D = 16; corresponds to early visibility obscuration. $tD_{16}$ < 1, very fast; 1–3 fast; 4–6 moderate; 7–10, slow; > 10, very slow smoker.

$SON_4$ = Smoke obscuration number over first 4 minutes of test $$[ \equiv (\sum_{t=1}^{4} D_i)/4]$$

indicates amount of smoke vs. rate of buildup early in the test. $SON_4 \leq 3$, very low; 4–10, low; 10–50, moderate; 50–100, high; > 22, very high.

A more detailed description of this test is given in D. Gross et al, ASTM Special Technical Publication 422, p. 106 (1967).

EXAMPLES

A formulation was prepared by mixing the following in a Brabender mixer (all parts are parts by weight):

| | |
|---|---|
| 100 parts | Poly(4-ethylphenoxy, phenoxy) phosphazene (See United States Patent 3,856,713) |
| 5 parts | MgO |
| 14 parts | Zinc Stearate |
| 8 parts | Varox |
| 2 parts | Benzoyl Peroxide | and filler and plasticizer as in the table below.

In the tables which follow, the following abbreviations are used, in addition to the previously defined symbols:

| | |
|---|---|
| TCP | Tricresylphosphate |
| LMW-APN | Low molecular weight (DSV 0.2) poly(4-ethyl-phenoxy, phenoxy phosphazene) |
| Santocizer 148 | Isodecyl diphenyl phosphate |
| MT Black | Carbon Black |
| Quso | Silane treated silica |
| phr | Parts by weight per 100 parts of poly(phosphazene) |

TABLE I

| | | | | NBS SMOKE DENSITY CHAMBER FLAMING CONDITION | | | | |
|---|---|---|---|---|---|---|---|---|
| Filler, | phr | Plasticizer, | phr | $D_{mc}$ | t.9$D_m$ | $tD_{16}$ | $SON_4$ | LOI |
| Al$_2$O$_3$ . 3H$_2$O | 200 | | | 55 | 2.7 | 1.4 | 40 | 46.8 – 48.0 |
| Al$_2$O$_3$ . 3H$_2$O | 100 | | | 24 | 2.3 | 1.7 | 19 | 40.4 |
| Mg(OH)$_2$ | 100 | | | | | | | |
| Mg(OH)$_2$ | 200 | | | 17 | 3.6 | 4.4 | 13 | 37.9 |
| Dawsonite | 200 | | | 58 | 6.0 | 0.9 | 35 | 41.2 |
| Dawsonite | 100 | | | 74 | 3.9 | 0.6 | 61 | 29.5 – 30.0 |
| Dawsonite | 100 | TCP | 30 | 78 | 4.6 | 0.5 | 56 | 27.0 – 27.5 |
| Dawsonite | 100 | LMW-APN | 30 | 88 | 2.7 | 0.5 | 80 | 26.5 – 27.0 |
| Al$_2$O$_3$ . 3H$_2$O | 100 | | | 102 | 3.6 | 0.5 | 80 | 32.5 – 33.0 |
| Al$_2$O$_3$ . 3H$_2$O | 100 | TCP | 30 | 213 | 2.7 | 0.3 | 172 | 30.0 – 30.5 |
| Al$_2$O$_3$ . 3H$_2$O | 100 | Santocizer 148 | 30 | 209 | 2.3 | 0.2 | 183 | 30.0 – 30.5 |
| Al$_2$O$_3$ . 3H$_2$O | 100 | LMW-APN | 30 | 119 | 1.6 | 0.4 | 112 | 30.0 – 30.5 |
| (MgCO$_3$)$_4$—Mg(OH)$_2$ . 5H$_2$O | 200 | | | 59 | 5.9 | 1.9 | 27 | 42.0 |
| (MgCO$_3$)$_4$—Mg(OH)$_2$ . 5H$_2$O | 200 | | | 72 | 7.3 | 1.8 | 26 | 42.6 |

The formulations were cured in a mold 6 inches by 9 inches by 0.020 inches for 20 minutes at 300° F. The cured samples were then tested in the National Bureau of Standards smoke density chamber described above and subjected to the Limiting Oxygen Index test (ASTM Test Specification ASTM-D-2863-70) noted above, lower $D_{mc}$ is indicative of lower smoke and higher LOI is indicative of better flame resistance.

Another series of formulations were prepared with the same polyphosphazene (100 parts by weight) and with 2 parts: Zinc-8 hydroxyquinolate 1.5–3 parts: Dicumyl peroxide (Dicup 40C).

These formulations were cured 20' at 340° F.

Another series of formulations shown below were prepared and cured and tested for smoke and flame properties. The samples were cured 20' at 340° F.

Recipe: Polymer 100 Poly(4-ethylphenoxy, phenoxy phosphazene) Filler as indicated, Zn-8-hydroxyquinolate, 2 phr, Dicup 40C, 1.5–3.0 phr.

TABLE II

| Filler, | phr. | NBS Smoke Density Chamber Flaming Condition | | | | |
|---|---|---|---|---|---|---|
| | | $D_{mc}$ | $t.9D_m$ | $tD_{16}$ | $SON_4$ | LOI |
| $Mg(OH)_2$ MT Black | 100* | 41 | 7.0 | 1.8 | 22 | |
| $Mg(OH)_2$ MT Black | 100** 40 | 35 | 9.3 | 2.1 | 17 | |
| $Mg(OH)_2$ | 100 | 101 | 1.4 | 1.9 | 84 | |
| $Mg(OH)_2$ MT Black | 100*** 40 | 21 | 7.9 | 3.4 | 15 | 34.5 – 35.0 |
| $Mg(OH)_2$ Quso | 100 40 | 15 | 11.6 | 11.5 | 14 | 29.5 – 30.0 |

*Sample contained 3.0 phr Dicup 40C.
**Sample contained 1.5 phr Dicup 40C.
***Sample contained 3.0 phr Dicup 40C, mixed and tested at a later date than first sample in Table.

We claim:

1. Filled poly(phosphazene) compositions exhibiting enhanced flame resistance and lower smoke output as compared to otherwise similar poly(phosphazene) compositions which have not been compounded with the specific filler hereinafter defined, consisting essentially of:
    at least one flame resistant poly(phosphazene); and
    at least one filler selected from the group consisting of compounds of Mg which compounds decompose endothermically when heated and release $CO_2$ or $H_2O$ when they decompose and which are selected from the group consisting of carbonates, bicarbonates, hydroxides and hydrated oxides of Mg, said filler being present in said composition in a weight at least approximately equal to the weight of said polyphosphazene.

2. Compositions of claim 1 including in addition at least one plasticizer and at least one compound of Al selected from the group of compounds which decompose endothermically when heated, and release $CO_2$ or $H_2O$ when they decompose and which are selected from the group consisting of carbonates, bicarbonates, hydroxides and hydrate oxides of Al.

3. The composition of claim 2 wherein the plasticizer is a triaryl phosphate.

4. A filled poly(phosphazene) according to claim 1 which has been cured.

5. The composition of claim 1 wherein the poly(phosphazene) is a phosphazene containing aryloxy and substituted aryloxy substituents on the P atoms.

6. The composition of claim 1 which includes a reinforcing filler.

7. The composition of claim 6 in which the reinforcing filler includes a carbon black.

8. The composition of claim 6 in which the reinforcing filler includes a fine silica.

9. The composition of claim 2 wherein the plasticizer is a low molecular weight poly(4-ethylphenoxy, phenoxy phosphazene).

* * * * *

UNITED STATES PATENT OFFICE
CERTIFICATE OF CORRECTION

Patent No. 4,064,095          Dated December 20, 1977

Inventor(s) Arthur Eugene Oberster and Davis Francis Lawson

It is certified that error appears in the above-identified patent and that said Letters Patent are hereby corrected as shown below:

Column 1, line 23, the formula reading "$(MgCO_3)_4 \cdot Mg(OH)_2 \cdot 5H_2O$, $Na_2O \cdot Al_2O_3 \cdot 2H_2O$" should read as:

--- $(MgCO_3)_4 \cdot Mg(OH)_2 \cdot 5H_2O$, $Na_2O \cdot Al_2O_3 \cdot 2CO_2 \cdot 2H_2O$ ---

Column 3, line 12, "3 inches x 3 inches" should read as --- 3 inches x 3 inches specimen in the support ---

Column 4, line 6, "$SON_4 \leq 3$," should read as --- $SON_4 \leq 3$, ---

Column 4, line 7, "50-100, high; > 22, very high" should read as ---50-100, high; > 200, very high ---

Column 5, Table II, Under the heading Filler, Second line from top, MT Black, under phr reads ' this should read as --- MT Black and under phr should be 40 ---

Signed and Sealed this

Twenty-fifth Day of April 1978

[SEAL]

Attest:

RUTH C. MASON      LUTRELLE F. PARKER
*Attesting Officer*      *Acting Commissioner of Patents and Trademarks*